(12) United States Patent
Nelson

(10) Patent No.: US 11,417,435 B2
(45) Date of Patent: Aug. 16, 2022

(54) CONTROL DRUM FOR A MOBILE NUCLEAR REACTOR

(71) Applicant: GE-Hitachi Nuclear Energy Americas LLC, Wilmington, NC (US)

(72) Inventor: Dennis Scott Nelson, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 0 days.

(21) Appl. No.: 16/731,127

(22) Filed: Dec. 31, 2019

(65) Prior Publication Data

US 2021/0202117 A1    Jul. 1, 2021

(51) Int. Cl.
| | |
|---|---|
| *G21C 7/08* | (2006.01) |
| *G21C 7/103* | (2006.01) |
| *G21C 7/28* | (2006.01) |
| *G21C 7/14* | (2006.01) |

(52) U.S. Cl.
CPC ............. *G21C 7/14* (2013.01); *G21C 7/08* (2013.01); *G21C 7/103* (2013.01); *G21C 7/28* (2013.01)

(58) Field of Classification Search
CPC ... G21C 7/08; G21C 7/12; G21C 7/14; G21C 7/18; G21C 7/24; B64G 1/408
USPC ......................................... 376/220, 223, 909
See application file for complete search history.

(56) References Cited

U.S. PATENT DOCUMENTS

| | | | |
|---|---|---|---|
| 3,228,847 A | 1/1966 | Parkinson et al. | |
| 3,239,424 A * | 3/1966 | Donald | G21F 3/00 376/287 |
| 3,296,083 A * | 1/1967 | Haake | G21C 15/10 376/373 |
| 3,423,844 A * | 1/1969 | Mittelman | G21K 1/10 376/108 |
| 3,485,717 A * | 12/1969 | Eich | G21C 7/113 376/333 |

(Continued)

FOREIGN PATENT DOCUMENTS

CN       109192329 A * 1/2019

OTHER PUBLICATIONS

Suvdantsetseg, Erdenechimeg. Neutronics and Transient Analysis of a Small Fast Reactor Cooled with Natural Circulation of Lead: ELECTRA: European Lead Cooled Training Reactor. Diss. KTH Royal Institute of Technology, 2014. (Year: 2014).*

(Continued)

*Primary Examiner* — Jack W Keith
*Assistant Examiner* — Jinney Kil
(74) *Attorney, Agent, or Firm* — Harness, Dickey & Pierce, P.L.C.

(57) ABSTRACT

Various example embodiments are directed towards an improved control drum, as well as systems, apparatuses, and/or methods for operating a nuclear reactor with a plurality of improved control drums. The control drum includes an outer shell, an inner shell, a plurality of tubes, the plurality of tubes including at least one neutron absorbing tube and at least one neutron scattering tube, and at least one baffle plate arranged between the outer shell and the inner shell, the at least one baffle plate including a plurality of perforations, and at least one perforation of the plurality of perforations configured to support a tube of the plurality of tubes.

20 Claims, 5 Drawing Sheets

(56) References Cited

U.S. PATENT DOCUMENTS

| | | | | |
|---|---|---|---|---|
| 3,607,642 | A * | 9/1971 | Murdock | G21C 3/338 376/447 |
| 3,778,344 | A * | 12/1973 | Walsh | G21D 5/02 376/210 |
| 3,793,832 | A * | 2/1974 | Moon | G21D 5/02 376/318 |
| 3,822,185 | A * | 7/1974 | Wetch et al. | G21C 7/14 376/417 |
| 4,111,747 | A * | 9/1978 | Eck | G21C 11/024 376/171 |
| 4,751,043 | A | 6/1988 | Freeman et al. | |
| 8,917,807 | B1 * | 12/2014 | Holden | G21C 3/60 376/182 |
| 2009/0225923 | A1 * | 9/2009 | Neeley | G21C 1/00 376/186 |
| 2015/0357056 | A1 * | 12/2015 | Shayer | G21C 7/28 376/220 |
| 2016/0049210 | A1 * | 2/2016 | Filippone | G21C 7/08 376/220 |
| 2016/0314863 | A1 * | 10/2016 | Singh | G21F 5/012 |
| 2019/0172594 | A1 * | 6/2019 | Lyons | G21C 9/02 |
| 2021/0082587 | A1 * | 3/2021 | Inman | B64G 1/408 |

OTHER PUBLICATIONS

Wallenius, Janne, Erdenechimeg Suvdantsetseg, and Andrei Fokau. "ELECTRA: European lead-cooled training reactor." Nuclear Technology 177.3 (2012): 303-313. (Year: 2012).*

Wolniewicz, Peter, et al. "Detecting neutron spectrum perturbations due to coolant density changes in a small lead-cooled fast nuclear reactor." Annals of Nuclear Energy 58 (2013): 102-109. (Year: 2013).*

Suvdantsetseg, Erdenechimeg, Janne Wallenius, and Sara Bortot. "Optimization of the reactivity control drum system of ELECTRA." Nuclear engineering and design 252 (2012): 209-214. (Year: 2012).*

Krolikowski, Igor P., and Jerzy Cetnar. "Neutronic and thermal-hydraulic coupling for 3D reactor core modeling combining MCB and fluent." Nukleonika 60.3, part 2 (2015): 531-536. (Year: 2015).*

International Search Report and Written Opinion of the International Searching Authority for corresponding International Application No. PCT/US2020/067149 dated Jun. 10, 2021.

* cited by examiner

CONTROL DRUM FOR A MOBILE NUCLEAR REACTOR

BACKGROUND

A nuclear reactor includes nuclear reaction control mechanisms, such as control rods and/or control drums, which control the reactivity of the nuclear fuel of the nuclear reactor. For example, in a conventional design, a nuclear reactor may include a plurality of solid cylindrical control drums installed in a reflector region surrounding the core of the nuclear reactor, with a section of the cross-section of each of the control drums containing a neutron absorbing material (e.g., a nuclear reaction poison, etc.), and the rest of the cross-section containing a neutron scattering material (e.g., a nuclear reflecting material, a nuclear shielding material, etc.). A conventional control drum may be constructed of solid materials, such as graphite or beryllium, formed to shape; or packed with neutron absorbing materials in a first radial section of the control drum, and with neutron scattering materials in the rest of the control drum.

When the plurality of control drums are in the control position (e.g., with the neutron absorbing section of the control drum facing the reactor core and/or the nuclear fuel rods in the nuclear reactor core), the neutron absorbing material absorbs neutrons emitted from the nuclear reactor core, thereby decreasing the reactivity of the reactor and/or preventing the reactor from reaching a critical state. The control drums in the control position are therefore used to shut down an operating nuclear reactor, or to maintain the nuclear reactor in a shutdown state. When the plurality of control drums are rotated to the operating position (e.g., with the neutron absorbing section facing away from the reactor core and/or the nuclear fuel rods), the neutrons emitted from the nuclear reactor core are not absorbed, and the nuclear reactor is allowed to reach criticality. Therefore, the control drums are in the operating position when the nuclear reactor is in a start-up state, or while the nuclear reactor is operating.

However, there are several issues facing the design of conventional control drums. First, conventional control drums are designed to be fabricated from solid neutron absorbing/scattering materials that are formed to specific shapes. It may be difficult to form these materials to the specific desired shapes, and/or the materials, such as beryllium, etc., may be hazardous to work with. This can make the control drum very expensive to produce.

Another issue facing conventional control drum designs relates to the physical expansion of the control drum during operating conditions of the nuclear reactor. For example, conventional control drums are typically constructed with stainless steel containment surrounding the neutron absorbing/scattering materials, and these materials, particularly the neutron absorbing/scattering materials within the control drums. may experience thermal expansion due to the heat generated from the nuclear reaction of the nuclear reactor core and/or the radiation absorbed by the materials. This thermal expansion may lead to cracking of the stainless steel containment of the control drum, and the loss/leakage of the neutron absorbing/scattering materials within the control drum.

SUMMARY

Various example embodiments relate to an improved control drum, as well as systems, apparatuses, and/or methods for operating a nuclear reactor with a plurality of improved control drums.

In at least one example embodiment, a control drum for a nuclear reactor may include an outer shell, an inner shell, a plurality of tubes, the plurality of tubes including at least one neutron absorbing tube and at least one neutron scattering tube, and at least one baffle plate arranged between the outer shell and the inner shell, the at least one baffle plate including a plurality of perforations, and at least one perforation of the plurality of perforations configured to support a tube of the plurality of tubes.

Some example embodiments of the control drum provide that the plurality of perforations are arranged along at least one ring of the at least one baffle plate, the at least one ring including at least a first sector and a second sector, the first sector including a plurality of neutron absorbing tubes and the second sector including a plurality of neutron scattering tubes.

Some example embodiments of the control drum provide that the at least one baffle plate is a plurality of baffle plates, and the plurality of baffle plates are each arranged between the outer shell and the inner shell along a longitudinal direction of the control drum.

Some example embodiments of the control drum provide that the at least one perforation of the plurality of perforations includes at least one spring configured to allow for expansion of the corresponding supported tube.

Some example embodiments of the control drum provide that the inner shell is configured to mate with a drive shaft via a magnetic coupling, the drive shaft is configured to mate with a drive mechanism, and the drive mechanism is configured to rotate the control drum such that the at least one neutron absorbing tube faces at least one nuclear fuel rod during a first state and the at least one neutron scattering tube faces the at least one nuclear fuel rod during a second state.

According to at least one example embodiment, the control drum may further include at least one torsional spring attached to the inner shell, the at least one torsional spring configured to rotate the control drum such that the at least one neutron absorbing tube faces the at least one nuclear fuel rod during a third state.

Some example embodiments of the control drum provide that the third state is a fail-safe state where at least one of the magnetic coupling or the drive mechanism has failed.

Some example embodiments of the control drum provide that the at least one neutron absorbing tube is configured to store neutron absorbing materials, the neutron absorbing materials having a form of a powder, pellets, or a solid, and the at least one neutron scattering tube is configured to store neutron scattering materials, the neutron scattering materials having a form of a powder, pellets, or a solid.

Some example embodiments of the control drum provide that the control drum is horizontally mounted in a reflector region surrounding a nuclear fuel assembly.

Some example embodiments of the control drum provide that the control drum is installed in a mobile nuclear reactor.

In at least one example embodiment, a nuclear reactor may include a plurality of nuclear fuel rods, a plurality of control drums, each control drum of the plurality of control drums attached to a drive shaft of a plurality of drive shafts, and at least one control drum of the plurality of control drums includes, a plurality of tubes, the plurality of tubes including at least one neutron absorbing tube and at least one neutron scattering tube and at least one baffle plate arranged between an outer shell and an inner shell, the at least one baffle plate including a plurality of perforations, and at least one perforation of the plurality of perforations configured to support a tube of the plurality of tubes, and a plurality of motors attached to the plurality of drive shafts, at least one motor of the plurality of motors configured to rotate the at least one control drum such that the at least one neutron absorbing tube of the at least one control drum faces the plurality of nuclear fuel rods during a first state, and the at least one neutron scattering tube of the at least one control drum faces the plurality of nuclear fuel rods during a second state.

Some example embodiments of the nuclear reactor provide that the plurality of perforations are arranged along at least one ring of the at least one baffle plate, the at least one ring including at least a first sector and a second sector, the first sector including a plurality of neutron absorbing tube and the second sector including a plurality of neutron scattering tube.

Some example embodiments of the nuclear reactor provide that the at least one baffle plate is a plurality of baffle plates, and the plurality of baffle plates are each arranged between the outer shell and the inner shell along a longitudinal direction of the control drum.

Some example embodiments of the nuclear reactor provide that the at least one perforation of the plurality of perforations includes at least one spring configured to allow for expansion of the corresponding supported tube.

Some example embodiments of the nuclear reactor provide that the inner shell is configured to mate with the drive shaft, the drive shaft is configured to mate with a drive mechanism, and the drive mechanism is configured to rotate the at least one control drum such that the at least one neutron absorbing tube faces the plurality of nuclear fuel rods during a first state and the at least one neutron scattering tube faces the plurality of nuclear fuel rods during a second state.

According to at least one example embodiment, the nuclear reactor may further include at least one torsional spring attached to the inner shell, the at least one torsional spring configured to rotate the control drum such that the at least one neutron absorbing tube faces the plurality of nuclear fuel rods during a third state.

Some example embodiments of the nuclear reactor provide that the third state is a fail-safe state where at least one of the magnetic coupling or the drive mechanism has failed.

Some example embodiments of the nuclear reactor provide that the at least one neutron absorbing tube is configured to store neutron absorbing materials, the neutron absorbing materials having a form of a powder, pellets, or a solid, and the at least one neutron scattering tube is configured to store neutron scattering materials, the neutron scattering materials having a form of a powder, pellets, or a solid.

Some example embodiments of the nuclear reactor provide that the plurality of control drums are horizontally mounted in a nuclear reactor core.

Some example embodiments of the nuclear reactor provide that the neutron absorbing materials includes at least one of boron carbide, hafnium, gadolinium, and the neutron scattering materials includes at least one of beryllium, graphite, europium.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated. In the drawings:

Figure 1:
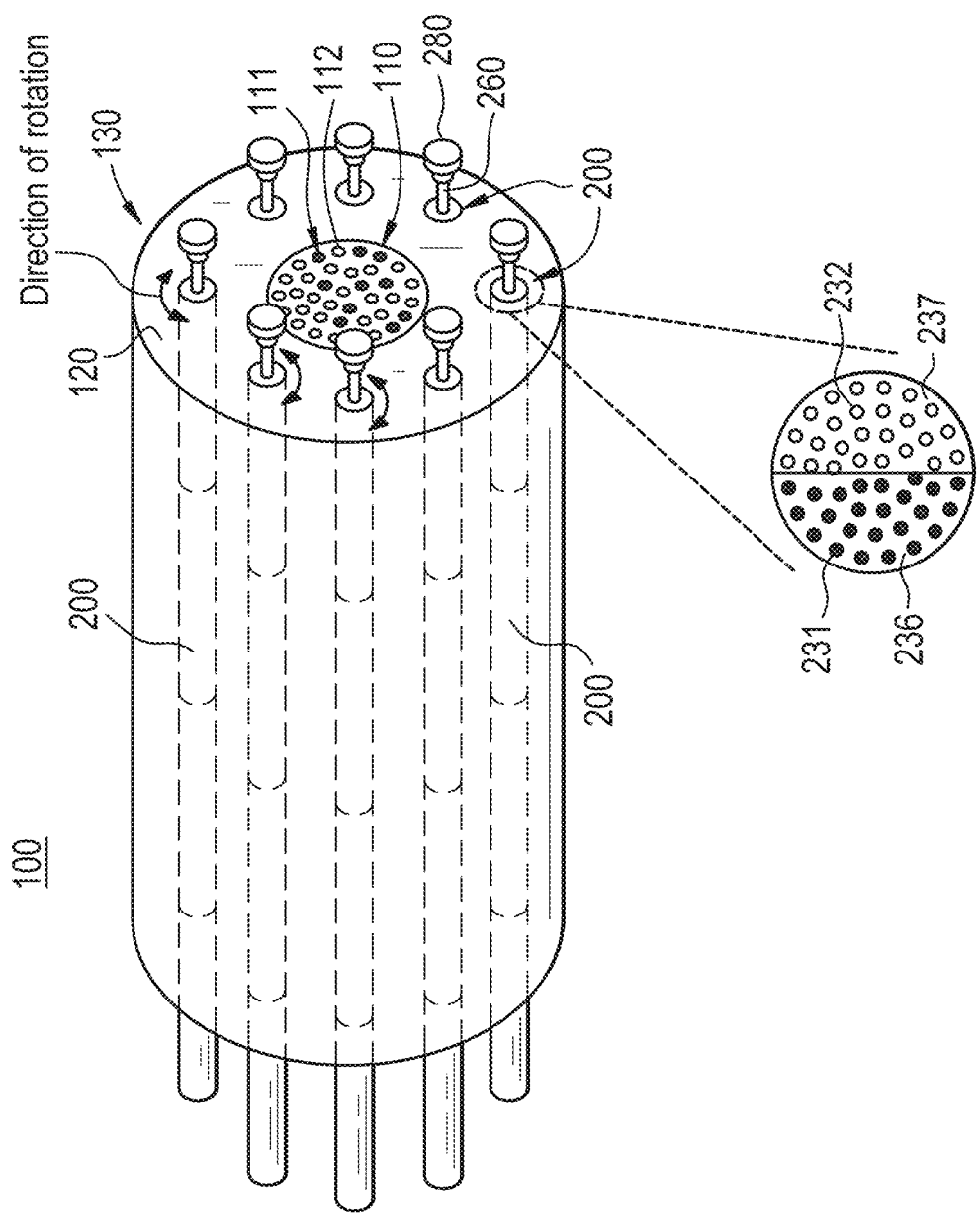
FIG. 1 illustrates a side view of a nuclear reactor core including a plurality of control drums according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given example embodiment, and should not be interpreted as defining or limiting the range of values or properties encompassed by example embodiments.

DETAILED DESCRIPTION

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Various example embodiments are directed towards an improved control drum, as well as systems, apparatuses, and/or methods for operating a nuclear reactor with a plurality of improved control drums. The control drum of one or more of the example embodiments may be particularly beneficial for small-scale (e.g., <300 MWe reactors) and/or mobile nuclear reactors because the control drums may be mounted in the nuclear reactor in a horizontal orientation, thereby decreasing the size requirements for the reactor control systems of the nuclear reactor in comparison to conventional control drums which must be mounted in a vertical orientation. The example embodiments may be particularly useful for small, mobile nuclear reactors, such as nuclear power plants for naval vessels, spacecraft, etc., as well as for portable nuclear reactors for transportation to geographic areas that lack access to electricity, such as geographic areas that have been devastated by a natural disaster.

Additionally, the control drum of the example embodiments may also provide the additional benefit of accommodating the expansion of the neutron absorbing material and the neutron scattering material from the heat generated by the nuclear reactor and/or from the absorption of radiation generated by the nuclear reactor.

Further, the control drum of the example embodiments may also allow a nuclear reactor designer to further fine-tune and/or optimize the distribution of the neutron absorbing materials, thereby improving the performance of the nuclear reactor and the control of the nuclear reactor.

FIG. 1 illustrates a side view of a nuclear reactor core including a plurality of control drums according to at least one example embodiment. According to at least one example embodiment, a nuclear reactor core 100 may include a nuclear fuel assembly 110, a plurality of control drums 200, a reflector region 120, and/or a vessel 130, but the example embodiments are not limited thereto. The nuclear reactor core 100 may be used in a gas-cooled nuclear reactor, but the example embodiments are not limited thereto, and the nuclear reactor may be another type of nuclear reactor, such as a boiling water reactor (BWR), pressurized water reactor (PWR), heavy water reactor, breeder reactor, etc. Further, according to some example embodiments, the nuclear reactor may be a mobile nuclear reactor (e.g., a portable nuclear reactor that may be installed on a vehicle, naval vessel, submersible vehicle, spacecraft, etc., and/or may be transported to different locations). In other example embodiments, the nuclear reactor may be used in an immobile and/or large-scale nuclear reactor (e.g., a commercial nuclear power plant, etc.).

According to at least one example embodiment, the vessel 130 is a body (e.g., container) which is configured to hold the nuclear fuel assembly 110, the plurality of control drums 200, the reflector region 120, and other structures, such as the coolant pipes (not shown), etc., of the nuclear reactor core, and may be formed from a metal or metal-alloy, such as stainless steel, etc., which does not interact with fission-inducing neutrons and is capable of withstanding the high operating temperatures of the nuclear reactor core. A reflector region 120 may surround the nuclear fuel assembly 110 and may be constructed from a neutron reflecting material (e.g., beryllium, graphite, europium, etc.). The reflector region 120 may reflect (and/or shield) neutrons emitted by the nuclear chain reaction from the nuclear fuel rods 111 back towards the nuclear fuel assembly 110.

Additionally, the reflector region 120 may include a plurality of control drums 200. Each of the control drums 200 may include at least one neutron absorbing section (e.g., poison section, etc.) 236 and at least one neutron scattering section (e.g., reflecting section, shielding section, etc.) 237. The control drums 200 may be mounted in a horizontal orientation (e.g., longitudinally, etc.) in relation to the nuclear fuel assembly 110, or in other words the end plates of the control drums 200 are in a horizontal orientation. In other example embodiments, the control drums 200 may be mounted in a vertical orientation (e.g., radially, etc.) in relation to the nuclear fuel assembly 110, or in other words, the end plates of the control drums 200 are in a vertical orientation.

The neutron absorbing section 236 of the control drums 200 may include at least one absorbing tube 231 that is longitudinally arranged within the at least one neutron absorbing section 236. The neutron scattering section 237 may include at least one scattering tube 232 that is longitudinally arranged within the at least one neutron scattering section 237. The control drums 200 may each be rotated into various positions, such as a startup position, an operation position, a shutdown position, etc., by a respective control drum drive mechanism, such as a drive shaft 260 and drive mechanism 280. The control drum drive mechanism will be discussed in further detail in connection with FIG. 2A. The neutron absorbing section 236 and the neutron scattering section 237 will be discussed in further detail in connection with FIG. 2C.

When the control drums 200 are in the shutdown position, the control drums 200 are rotated such that the neutron absorbing sections 236 of the control drums 200 face towards the nuclear fuel assembly 110, and the neutron scattering sections 237 of the control drums 200 face away from the nuclear fuel assembly 110. While in the shutdown position, the neutron absorbing sections 236 of the control drums 200 absorb the neutrons emitted by the nuclear fuel rods 111, thereby decreasing and/or preventing the nuclear fuel rods 111 from reaching criticality (e.g., a self-sustaining nuclear fission chain reaction). When the control drums 200 are in the startup position, the control drums 200 are rotated such that the neutron absorbing sections 236 face away from the nuclear fuel assembly 110, and the neutron scattering sections 237 face towards the nuclear fuel assembly 110. While in the startup position, the neutron scattering sections 237 of the control drums 200 reflect back any neutrons emitted by the nuclear fuel rods 111, thereby allowing the nuclear fuel rods 111 to reach criticality. However, the example embodiments are not limited thereto, and there may be other positions to which the control drums 200 may be set, such as one or more operational positions, etc.

The nuclear fuel rods 111 may contain fissile materials, such as enriched uranium (U-235), plutonium (PU-239), etc. As discussed above, when the neutron absorbing section 236 of the control drums 200 face away from the nuclear fuel assembly 110, the fissile material within the nuclear fuel rods 111 undergo a nuclear fission process. This nuclear fission process generates heat which may be transferred to a gas (e.g., helium, etc.) that is pumping within the heat pipes 112. The heated gas may be used to drive electric turbines (not shown) that generate electricity.

According to some example embodiments, the nuclear fuel assembly 110 may further include coolant pipes (not shown) that are used to pump coolant (e.g., water, borated water, a liquid metal, such as NaK, etc., liquid sodium, molten sodium, gases, etc.) into the nuclear fuel assembly 110 to lower the operating temperature of the nuclear reactor core to a desired (safe) temperature. Additionally, according to at least one example embodiment, the nuclear reactor core 100 may further include a secondary control system (not shown) that includes a plurality of control rods (not shown) which may be inserted into the nuclear fuel assembly 110 to further control the nuclear chain reaction (e.g., the reactivity level) of the nuclear fuel rods 111 inside the nuclear fuel assembly 110.

While FIG. 1 illustrates an example nuclear reactor core, the example embodiments are not limited thereto. For example, the shape of the nuclear reactor core and/or the elements of the nuclear reactor core (e.g., the control drums, nuclear fuel assembly, vessel, reflector region, fuel rods, heat pipes, etc., may be different from the shapes shown in FIG. 1, and/or the number of each individual element may differ from the amount shown in FIG. 1. For example, the shape of the vessel, nuclear fuel assembly, control drums, etc., may be a square shape, a pentagonal shape, a hexagonal shape, an octagonal shape, etc., and/or the number of control drums, fuel rods, heat pipes, etc., may be greater than or less than the numbers illustrated in FIG. 1.

Figure 2A:
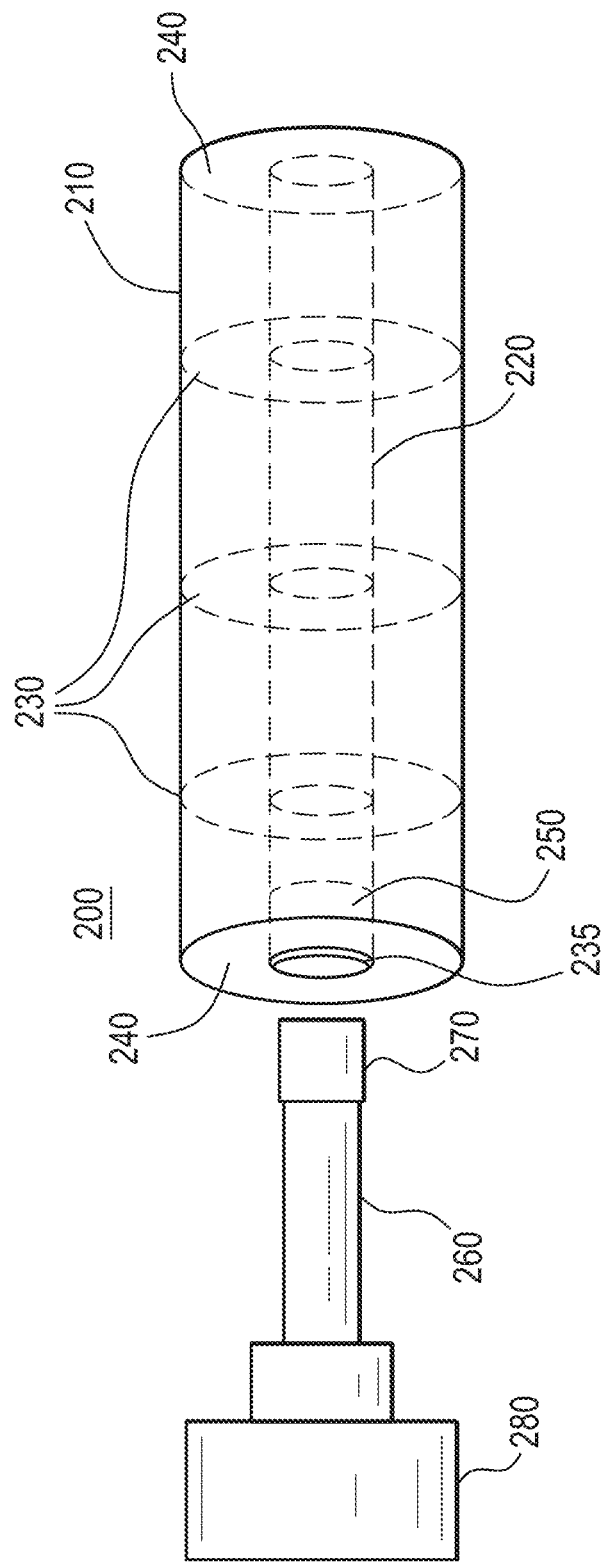
FIG. 2A illustrates an exterior view of a control drum according to at least one example embodiment.
Figure 2B:
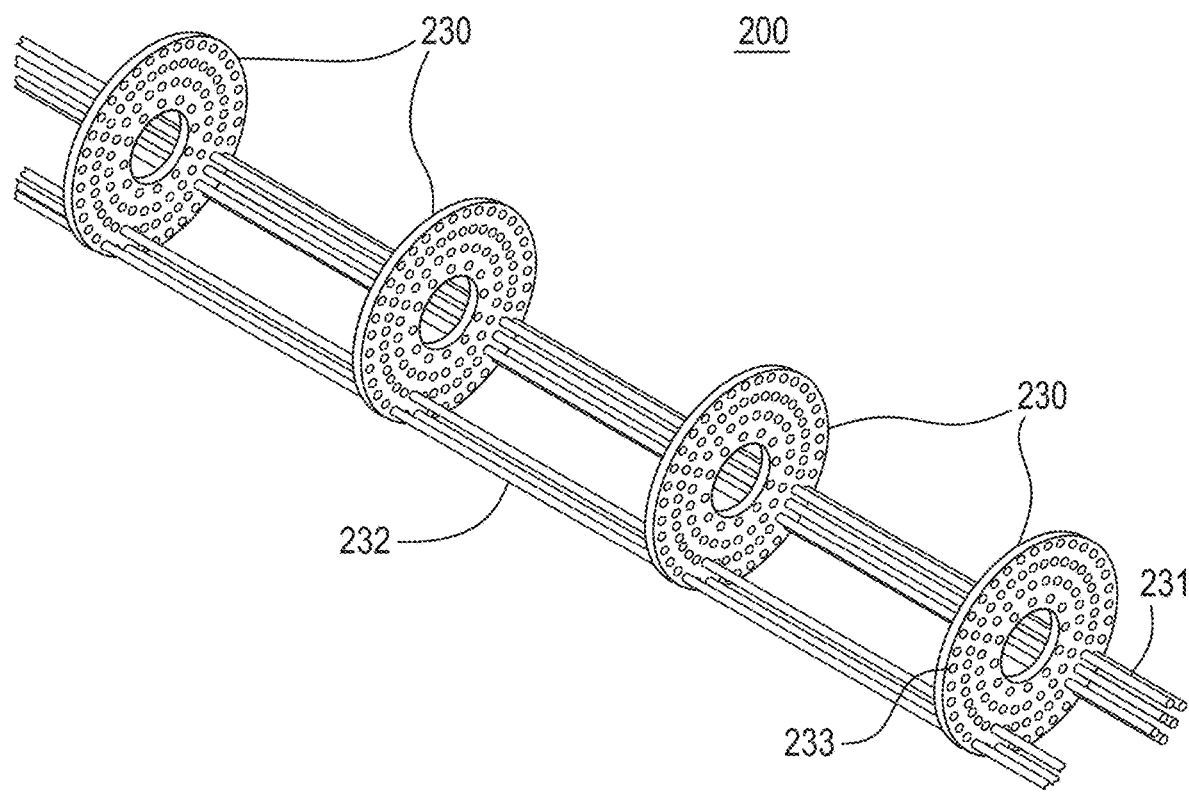
FIG. 2B illustrates an interior view of a control drum according to at least one example embodiment.
Figure 2C:
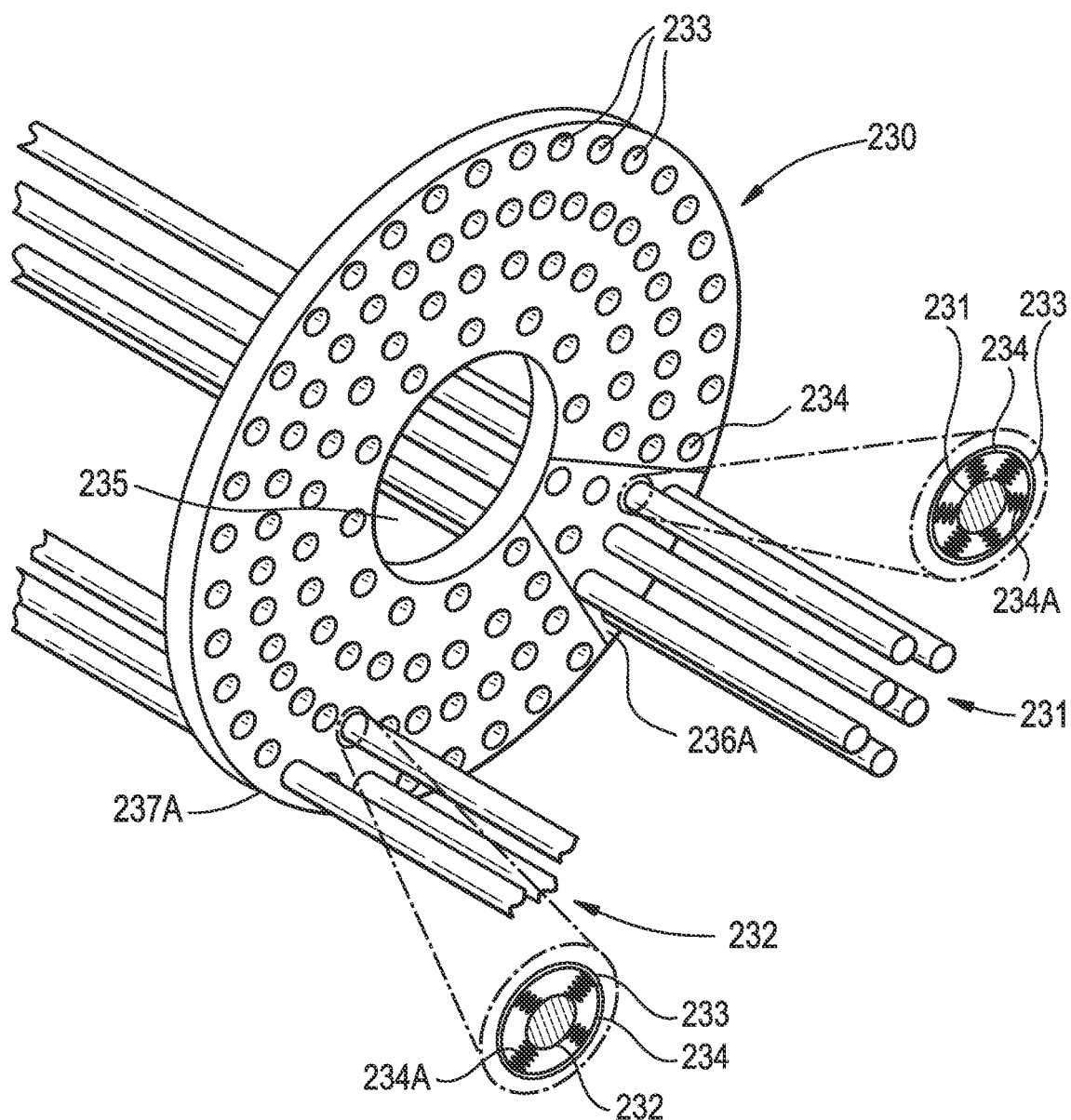
FIG. 2C illustrates a close-up view of a baffle plate, absorbing tubes, and scattering tubes according to at least one example embodiment.

Referring now to FIGS. 2A to 2C, FIG. 2A illustrates an exterior view of a control drum according to at least one example embodiment, FIG. 2B illustrates an interior view of a control drum according to at least one example embodiment, and FIG. 2C illustrates a close-up view of a baffle plate, absorbing tubes, and scattering tubes according to at least one example embodiment.

Referring now to FIG. 2A, according to at least one example embodiment, a control drum 200 may include an outer shell 210, an inner shell 220, a plurality of baffle plates 230, and/or a plurality of end plates 240, but the example embodiments are not limited thereto and may include a greater or lesser number of constituent elements. For example, the number of baffle plates may be greater or lesser than the number shown in FIG. 2A. The outer shell 210, the inner shell 220, the plurality of baffle plates 230, and the plurality of end plates 240 may be constructed using a material that does not interact with fission-inducing neutrons, and is capable of withstanding the high operating temperatures of a nuclear reactor core, such as stainless steel, etc., but the example embodiments are not limited thereto. The plurality of baffle plates 230 may be arranged longitudinally between the outer shell 210 and the inner shell 220, and may support at least one neutron absorbing tubes (e.g., neutron poison rods, control rods, etc.) (not shown), and/or at least one neutron scattering tubes (e.g., neutron reflecting rods, shielding rods, etc.) (not shown), but are not limited thereto. The baffle plates 230, neutron absorbing tubes, and neutron scattering tubes will be discussed in further detail in connection with FIGS. 2B and 2C.

The control drum 200 may further include two end plates 240 located at each end of the control drum 200. At least one of the end plates 240 may include an interior opening 235 and a torsional spring 250, etc., but the example embodiments are not limited thereto. According to at least one example embodiment, the torsional spring 250 may be located (e.g., installed, attached and/or engaged, etc.) within the interior opening 235 and/or the inner shell 220, but is not limited thereto. The torsional spring 250 may be configured to return (e.g., rotate) the control drum to an control position and/or shutdown position (e.g., where the neutron absorbing section and/or neutron absorbing tubes of the control drum face the nuclear fuel assembly 110 and/or the nuclear fuel rods in the nuclear reactor core) from an operating position (e.g., where the neutron absorbing section and/or neutron absorbing tubes of the control drum face away from the nuclear fuel assembly 110 and/or the nuclear fuel rods).

Further, the control drum 200 may be mated to a drive shaft 260 via a magnetic coupling 270 at the interior opening 235, and the drive shaft 260 may be mated to a drive mechanism 280. However, the example embodiments are not limited thereto, and other coupling mechanism may be used to mate the control drum to the drive shaft and the drive shaft to the drive mechanism, such as gears, etc. The drive mechanism 280 may include a motor, a braking system, etc., and may be configured to rotate the control drum 200 based on instructions (e.g., command signals, messages, etc.) received from at least one control processor (not shown) of the nuclear reactor via a network (not shown) and/or communication bus (not shown). The instructions may include a desired position (e.g., an angular position to which the drive mechanism 280 is to turn the control drum 200) information and/or a desired rotation rate information (e.g., the rotation speed at which the drive mechanism 280 is to turn the control drum 200), etc., but the example embodiments are not limited thereto and may include other indications.

For example, the control drums may be in the shutdown position (e.g., 0°) during a shutdown state, fail-safe state, and/or SCRAM state of the nuclear reactor. The control processor may then transmit a start-up instruction to the drive mechanism 280, which then rotates the control drum 200 to the operating position (e.g., 180°) at a desired speed using the drive shaft 260. The control processor may also transmit a shut-down instruction to the drive mechanism 280 which causes the drive mechanism 280 to rotate the control drum 200 to the shutdown position at a desired speed using the drive shaft 260. Additionally, the example embodiments are not limited thereto, and the control processor may transmit instructions to the drive mechanism 280 to rotate the control drum 200 into intermediate positions between the shutdown position and the operating position (e.g., a position between 0° and 180°), wherein a portion of the neutron absorbing tubes may still be facing the nuclear fuel assembly 110 and/or otherwise have a material effect on the reactivity of the nuclear fuel assembly 110.

Further, according to some example embodiments, the torsional spring 250 may act as a fail-safe device, and may be configured to automatically rotate the control drum 200 to the shutdown position (e.g., 0°) in the event that there is a failure in the drive mechanism 280 (e.g., a power failure to the drive mechanism 280, a disruption in the communications from the control processor to the drive mechanism 280, a failure in the drive mechanism 280 (e.g., motor) itself, etc.), and/or the magnetic coupling 270, etc., in order to automatically decrease the reactivity of the nuclear fuel assembly 110 and/or shutdown the nuclear fuel assembly 110 in the event of any abnormal event in the controlling of the control drum 200.

While FIG. 2A illustrates the control drum 200 as having a cylindrical shape, the example embodiments are not limited thereto, and the control drum 200 may take the form any desired shape (e.g., prisms, etc.). Additionally, while various angles are discussed in relation to the positions (e.g., shutdown and operating positions) of the control drum, the example embodiments are not limited thereto and these angles are provided for example purposes only. One of ordinary skill in the art will understand that any desired angles and/or positions may be used in accordance with the design parameters of the nuclear reactor.

Referring now to FIGS. 2B and 2C, according to at least one example embodiment, the interior of a control drum 200 may include a plurality of baffle plates 230, a plurality of absorbing tubes 231, and a plurality of scattering tubes 232, etc., but the example embodiments are not limited thereto. As illustrated in FIG. 2B, the interior of the control drum 200 may include a plurality of baffle plates 230 arranged longitudinally within the control drum 200 at desired distances. The plurality of baffle plates 230 may support a plurality of absorbing tubes 231 and a plurality of scattering tubes 232 using a plurality of perforations 233 within the baffle plates 230.

As illustrated in FIG. 2C, each of the baffle plates may be drilled with a plurality of perforations 233 to support the absorbing tubes 231 (e.g., neutron absorbing tubes/rods, neutron poison tubes/rods, etc.) and/or scattering tubes 232 (e.g., neutron scattering tubes/rods, neutron reflecting tubes/rods, neutron shielding tubes/rods, etc.). According to some example embodiments, the perforations 233 may be arranged in one or more concentric rings around a central opening of the baffle plate 230, but the example embodiments are not limited thereto and the perforations 233 may be arranged in any desired arrangement and/or location on the baffle plate 230. Additionally, while FIGS. 2B and 2C illustrate a number of perforations that do not hold an absorbing tube 231 or a scattering tube 232 for the sake of clearly illustrating the various elements of the baffle plates 230, the example embodiments are not limited thereto. For example, according to at least one example embodiment, each of the perforations may hold either an absorbing tube 231 or a scattering tube 232. Additionally, the number of perforations are not limited to the number of perforations illustrated in FIGS. 2B and 2C, and instead there may be a greater or lesser number of perforations in the baffle plates 230.

Each of the perforations 233 may further include a spring holder 234, which may include at least one spring 234A. The spring holder 234 may receive, engage and/or support a tube or rod, such as an absorbing tube 231 or a scattering tube 232, using the attached spring 234A. The diameter of the perforation 233 may be larger than the diameter of the tube, such that when the tube inserted into the perforation 233 experiences physical expansion due to thermal conditions and/or absorbed radiation, the tube is not materially constricted by the diameter of the perforation 233, and the tube does not crack and/or rupture due to the physical expansion of the tube. Further, the spring(s) 234A of the spring holder 234 are configured to support the inserted tube so that some or all of the vibrations and/or shocks experienced by the control drum 200 and/or nuclear reactor are absorbed by the spring(s) 234A of the spring holder 234.

According to at least one example embodiment, each of the absorbing tubes 231 (e.g., neutron absorbing tubes, neutron poison rods, etc.) may include a container (e.g., rod, canister, etc.), which stores (e.g., contain, hold, etc.) neutron absorbing material, such as boron, carbide, hafnium, gadolinium, etc. While FIGS. 2B and 2C illustrate the absorbing tubes 231 as having a cylindrical shape, the example embodiments are not limited thereto and the absorbing tubes 231 may take the form any desired shape (e.g., prisms, etc.). The container of the absorbing tube 231 may be constructed using a material that does not interact with fission-inducing neutrons and is capable of withstanding the high operating temperatures of a nuclear reactor core, such as stainless steel, etc., and is configured to store the neutron absorbing material(s) internally. The neutron absorbing material may be formed as a solid mass, formed as a plurality of pellets, formed as a powder, gas, etc., but the example embodiments are not limited thereto. Additionally, the absorbing tube may be a solid mass formed from one or more of the neutron absorbing materials without the use of the container, and/or the container may be externally plated with the neutron absorbing material(s).

Further, according to other example embodiments, the container may store a mixture of neutron absorbing materials, or in other words the container may store two or more neutron absorbing materials. Additionally, according to some example embodiments, the container may include several segments (and/or chambers) where each segment may be formed using (and/or stores) a separate neutron absorbing material, based on the design requirements for the reactivity control characteristics of the nuclear reactor design.

According to at least one example embodiment, each of the scattering tubes 232 scattering tubes 232 (e.g., neutron scattering tubes/rods, neutron reflecting tubes/rods, neutron shielding tubes/rods, etc.) may include a container (e.g., rod, canister, etc.), which stores (e.g., contain, hold, etc.) neutron scattering material, such as beryllium, graphite, europium, etc. While FIGS. 2B and 2C illustrate the scattering tubes 232 as having a cylindrical shape, the example embodiments are not limited thereto and the scattering tubes 232 may take the form any desired shape (e.g., prisms, etc.). The container of the scattering tubes 232 may be constructed using a material that does not interact with fission-inducing neutrons and is capable of withstanding the high operating temperatures of a nuclear reactor core, such as stainless steel, etc., and is configured to store the neutron scattering material(s) internally. The neutron scattering material may be formed as a solid mass, formed as a plurality of pellets, formed as a powder, gas, etc., but the example embodiments are not limited thereto. Additionally, the scattering tube 232 may be a solid mass formed from one or more of the neutron scattering materials without the use of the container, and/or the container may be externally plated with the neutron scattering material(s).

Further, according to other example embodiments, the container may store a mixture of neutron scattering materials, or in other words the container may store two or more neutron scattering materials. Additionally, according to some example embodiments, the container may include several segments (and/or chambers) where each segment may be formed using (and/or stores) a separate neutron scattering material, based on the design requirements for the reactivity control characteristics of the nuclear reactor design.

According to some example embodiments, each baffle plate 230 may include at least one neutron absorbing sector (e.g., poison sector, etc.) 236A and at least one neutron scattering sector (e.g., reflecting sector, shielding sector, etc.) 237A. The neutron absorbing sector 236A may be a first radial sector of the baffle plate 230 wherein some or all of the absorbing tubes 231 are arranged, and the neutron scattering sector 237A may be a second radial sector of the baffle plate 230 wherein some or all of the scattering tubes 232 are arranged, etc. The neutron absorbing sectors 236A of the plurality of baffle plates 230 may compose the neutron absorbing section 236 of a control drum 200, and the neutron scattering sectors 237A of the plurality of baffle plates 230 may compose the neutron scattering section 237 of the control drum 200.

According to some example embodiments, one or more scattering tubes 232 may be located in the neutron absorbing section 236, e.g., at the edges of the neutron absorbing section 236, and/or one or more absorbing tubes 231 may be located in the neutron scattering section 237 based on the neutron absorption/scattering design requirements of the control drums for a nuclear reactor. Additionally, according to other example embodiments, each ring (and/or row, etc.) of the neutron absorbing section 236 or neutron scattering section 237, may include absorbing rods 231 and/or scattering rods 232 of a different absorbing and/or scattering material from the other rings (and/or rows) of the control drum, based on the design requirements for the reactivity control characteristics of the nuclear reactor design. In other words, the absorbing tubes and the scattering tubes may be arranged in various desired patterns or arrangements, and there may be radial, azimuthal, and/or axial variation of the absorbing/scattering tubes.

While FIG. 2C illustrates one neutron absorbing section, and one neutron scattering section, the example embodiments are not limited thereto. For example, the example embodiments may include two or more neutron absorbing sections and/or neutron scattering sections, etc.

Figure 3:
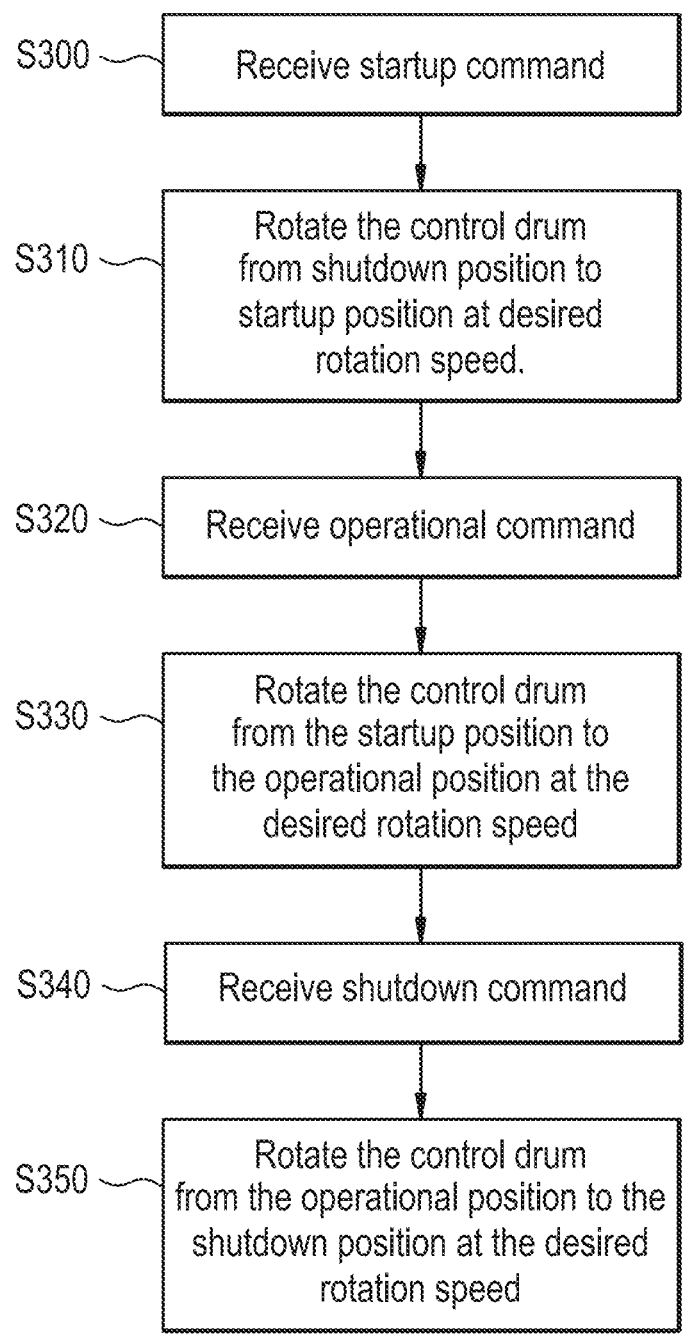
FIG. 3 illustrates a flowchart depicting a method of operating at least one control drum in a nuclear reactor according to at least one example embodiment.

Referring now to FIG. 3, FIG. 3 illustrates a flowchart depicting a method of operating at least one control drum in a nuclear reactor according to at least one example embodiment.

According to at least one example embodiment, in operation S300, at least one control processor may transmit a startup command to at least one drive mechanism connected to at least one control drum. The control drum may be assumed to start in a shutdown position. Additionally, the startup command may include a desired startup angular position and/or desired startup rotation rate (e.g., a desired position for the control drum and/or rotation rate during the startup state of the nuclear reactor core).

In operation S310, the drive mechanism rotates the control drum from its current position, e.g., the shutdown state (and/or position), to the desired startup angular position at the desired startup rotation rate included in the startup command.

In operation S320, the control processor may transmit an operational command to the drive mechanism. The operational command may include a desired operational angular position and/or desired operational rotation rate (e.g., a desired position for the control drum and/or rotation rate during the operational state of the nuclear reactor core based on the reactivity conditions of the nuclear reactor core).

In operation S330, the drive mechanism rotates the control drum from its current position, e.g., the startup state (and/or position), to the desired operational angular position at the desired operational rotation rate included in the operational command.

However, according to some example embodiments, the operational state may be the same as the startup state, and operations S320 and S330 may be omitted.

In operation S340, the control processor may transmit a shutdown command to the drive mechanism. The shutdown command may include a desired shutdown angular position and/or desired shutdown rotation rate (e.g., a desired position for the control drum and/or rotation rate during the shutdown state of the nuclear reactor core based on the reactivity conditions of the nuclear reactor core).

In operation S350, the drive mechanism rotates the control drum from its current position, e.g., the operational state (and/or position), to the desired shutdown angular position at the desired shutdown rotation rate included in the shutdown command.

As will be appreciated, the methods, systems, and/or apparatuses according to the example embodiments have several advantages. The control drum of the example embodiments may be mounted in a nuclear reactor in a horizontal orientation, thereby decreasing the size requirements for the reactor control systems of the nuclear reactor in comparison to conventional control drums which must be mounted in a vertical orientation. Additionally, the control drum of the example embodiments may also provide the additional benefit of accommodating the expansion of the neutron absorbing material and the neutron scattering material from the heat generated by the nuclear reactor and/or from the absorption of radiation generated by the nuclear reactor. Further, the control drum of the example embodiments may also allow a nuclear reactor designer to further fine-tune and/or optimize the distribution of the neutron absorbing materials, thereby improving the performance of the nuclear reactor and the control of the nuclear reactor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A system including at least one control drum for a nuclear reactor, the at least one control drum comprising:
   an outer shell;
   an inner shell;
   a plurality of tubes, the plurality of tubes including at least one neutron absorbing tube and at least one neutron scattering tube,
      the at least one neutron absorbing tube configured to contain neutron absorbing material, the neutron absorbing material including at least one of boron material, carbide material, hafnium material, gadolinium material, or any combinations thereof, and
      the at least one neutron scattering tube configured to contain neutron scattering material, the neutron scattering material including at least one of beryllium material, graphite material, europium material, or any combinations thereof; and
   the at least one baffle plate including a plurality of perforations, wherein each perforation of the plurality of perforations is configured to receive and support a corresponding tube of the plurality of tubes.

2. The system of claim 1, wherein
the plurality of perforations are arranged along at least one ring of the at least one baffle plate, the at least one ring including at least a first sector and a second sector, the first sector including a plurality of neutron absorbing tubes and the second sector including a plurality of neutron scattering tubes, the plurality of neutron absorbing tubes including the at least one neutron absorbing tube, and the plurality of neutron scattering tubes including the at least one neutron scattering tube.

3. The system of claim 1, wherein
the at least one baffle plate is a plurality of baffle plates; and
the plurality of baffle plates are sequentially arranged between the outer shell and the inner shell along a first direction of the control drum.

4. The system of claim 1, wherein
each perforation of the plurality of perforations includes at least one spring configured to allow for expansion of a corresponding supported tube.

5. The system of claim 1, further comprising:
a drive mechanism including a drive shaft, the drive shaft configured to mate with the inner shell via a magnetic coupling; and
   the drive mechanism is further configured to rotate the control drum via the drive shaft such that the at least one neutron absorbing tube faces at least one nuclear fuel rod during a first state of the nuclear reactor and the at least one neutron scattering tube faces the at least one nuclear fuel rod during a second state of the nuclear reactor.

6. The system of claim 5, further comprising:
at least one torsional spring attached to the inner shell, the at least one torsional spring configured to rotate the control drum via the drive shaft such that the at least one neutron absorbing tube faces the at least one nuclear fuel rod during a third state of the nuclear reactor.

7. The system of claim 6, wherein the third state is a fail-safe state of the nuclear reactor where at least one of the magnetic coupling or the drive mechanism has failed.

8. The system of claim 1, wherein
the neutron absorbing material has a form of a powder, pellets, or a solid; and
the neutron scattering material has a form of a powder, pellets, or a solid.

9. The system of claim 1, wherein the control drum is horizontally mounted in a reflector region surrounding a nuclear fuel assembly of the nuclear reactor, the control drum horizontally mounted with respect to the nuclear reactor.

10. The system of claim 1, wherein the control drum is configured to be installed in the nuclear reactor, the nuclear reactor being a mobile nuclear reactor.

11. A nuclear reactor comprising:
   a plurality of nuclear fuel rods;
   a plurality of control drums, each control drum of the plurality of control drums attached to a drive shaft of a plurality of drive shafts, and at least one control drum of the plurality of control drums includes,
      a plurality of tubes, the plurality of tubes including at least one neutron absorbing tube and at least one neutron scattering tube,
         the at least one neutron absorbing tube configured to contain neutron absorbing material, the neutron absorbing material including at least one of boron material, carbide material, hafnium material, gadolinium material, or any combinations thereof, and
         the at least one neutron scattering tube configured to contain neutron scattering material, the neutron scattering material including at least one of beryllium material, graphite material, europium material, or any combinations thereof, and
      at least one baffle plate arranged between an outer shell and an inner shell, the at least one baffle plate including a plurality of perforations, wherein each perforation of the plurality of perforations is configured to receive and support a corresponding tube of the plurality of tubes; and
   a plurality of motors attached to the plurality of drive shafts, at least one motor of the plurality of motors configured to rotate the at least one control drum such that the at least one neutron absorbing tube of the at least one control drum faces the plurality of nuclear fuel rods during a first state, and the at least one neutron scattering tube of the at least one control drum faces the plurality of nuclear fuel rods during a second state.

12. The nuclear reactor of claim 11, wherein
the plurality of perforations are arranged along at least one ring of the at least one baffle plate, the at least one ring including at least a first sector and a second sector, the first sector including a plurality of neutron absorbing tubes and the second sector including a plurality of neutron scattering tubes, the plurality of neutron absorbing tubes including the at least one neutron absorbing tube, and the plurality of neutron scattering tubes including the at least one neutron scattering tube.

13. The nuclear reactor of claim 11, wherein
the at least one baffle plate is a plurality of baffle plates; and
the plurality of baffle plates are sequentially arranged between the outer shell and the inner shell along a first direction of the at least one control drum.

14. The nuclear reactor of claim 11, wherein
each perforation of the plurality of perforations includes at least one spring configured to allow for expansion of a corresponding supported tube.

15. The nuclear reactor of claim 11, wherein
the inner shell is configured to mate with the drive shaft via a magnetic coupling.

16. The nuclear reactor of claim 15, further comprising:
at least one torsional spring attached to the inner shell, the at least one torsional spring configured to rotate the at least one control drum via the drive shaft such that the at least one neutron absorbing tube faces the plurality of nuclear fuel rods during a third state.

17. The nuclear reactor of claim 16, wherein the third state is a fail-safe state where at least one of the magnetic coupling or the at least one motor has failed.

18. The nuclear reactor of claim 11, wherein
the neutron absorbing material has a form of a powder, pellets, or a solid; and
the neutron scattering material has a form of a powder, pellets, or a solid.

19. The nuclear reactor of claim 18, wherein the plurality of control drums are horizontally mounted in a nuclear reactor core of the nuclear reactor.

20. The nuclear reactor of claim 18, wherein
the neutron absorbing material includes at least one of boron carbide, hafnium, gadolinium, or any combinations thereof; and
the neutron scattering material includes at least one of beryllium, graphite, europium, or any combinations thereof.

* * * * *